United States Patent
Bostak et al.

(10) Patent No.: US 7,848,369 B1
(45) Date of Patent: Dec. 7, 2010

(54) OPTICAL MODULATOR DRIVE CIRCUIT WITH INTEGRATED LOW POWER OUTPUT BIAS VOLTAGE CONTROL

(75) Inventors: Jeffrey S. Bostak, San Martin, CA (US); Ting-Kuang Chiang, Saratoga, CA (US); Michael Kauffman, Campbell, CA (US)

(73) Assignee: Infinera Corporation, Sunnyvale, CA (US)

( * ) Notice: Subject to any disclaimer, the term of this patent is extended or adjusted under 35 U.S.C. 154(b) by 0 days.

(21) Appl. No.: 12/343,356

(22) Filed: Dec. 23, 2008

(51) Int. Cl.
*H01S 3/10* (2006.01)
(52) U.S. Cl. ............... 372/26; 372/29.012; 372/38.04; 398/183; 398/186; 359/237
(58) Field of Classification Search ............... 372/26, 372/29.012, 38.04; 398/183, 186; 359/237
See application file for complete search history.

(56) References Cited

U.S. PATENT DOCUMENTS

| | | | | |
|---|---|---|---|---|
| 4,899,344 A | * | 2/1990 | Shibata et al. | 372/29.012 |
| 5,191,589 A | * | 3/1993 | Amano et al. | 372/38.02 |
| 5,398,008 A | * | 3/1995 | Nissler et al. | 332/178 |
| 5,508,729 A | * | 4/1996 | Yamazaki | 347/247 |
| 5,706,116 A | * | 1/1998 | Sugata | 398/182 |
| 6,829,441 B2 | * | 12/2004 | Chujo et al. | 398/183 |
| 7,031,357 B2 | * | 4/2006 | Bowler et al. | 372/38.02 |
| 7,061,950 B2 | * | 6/2006 | Hongo et al. | 372/38.02 |
| 7,099,596 B2 | * | 8/2006 | Watanabe et al. | 398/183 |
| 7,119,939 B2 | * | 10/2006 | Watanabe | 359/279 |

* cited by examiner

*Primary Examiner*—Kenneth B. Wells
(74) *Attorney, Agent, or Firm*—Ross M. Carothers

(57) ABSTRACT

A modulator drive circuit provides a modulator drive signal to modulate an optical signal for transport across a network infrastructure. The modulator drive circuit powered by an adjustable voltage source, such that the modulator drive signal is generated from a data signal and the adjustable voltage source, an AC component of the modulator drive signal being derived from the data signal while a DC component of the modulator drive signal being derived from the adjustable voltage source. An array of such modulator drive circuits are provided on a single substrate.

21 Claims, 6 Drawing Sheets

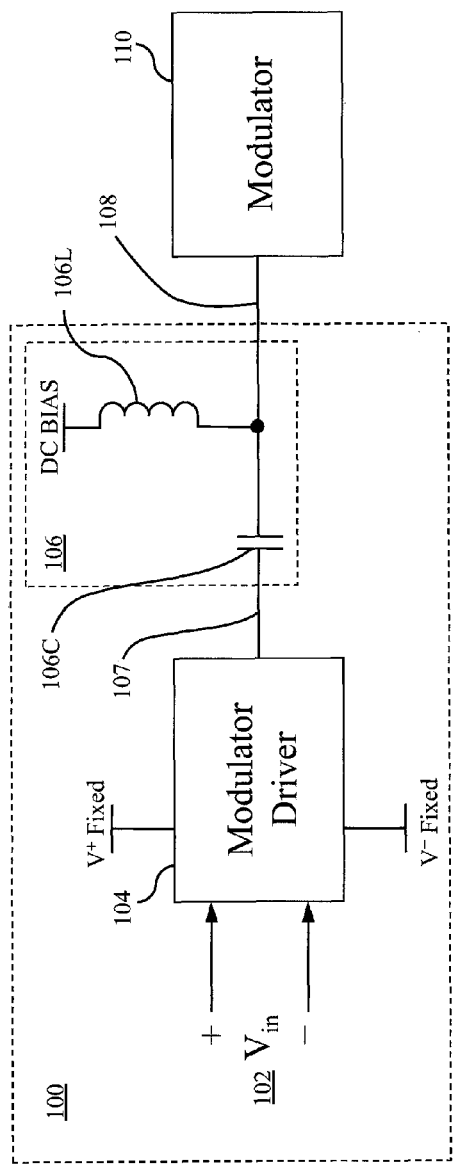
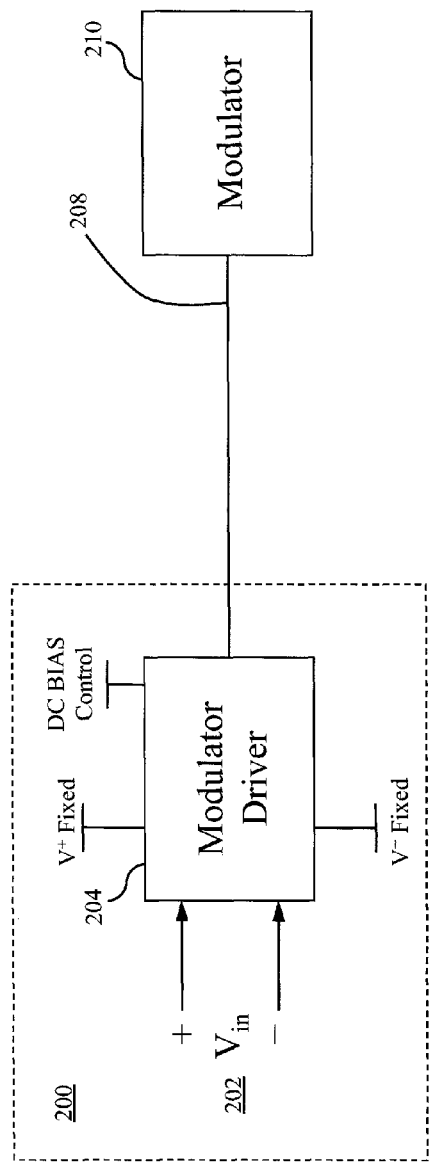
Figure 1
(Prior Art)
Figure 2
(Prior Art)

OPTICAL MODULATOR DRIVE CIRCUIT WITH INTEGRATED LOW POWER OUTPUT BIAS VOLTAGE CONTROL

BACKGROUND OF THE INVENTION

1. Field of the Invention

This invention relates generally to modulator drivers and, more particularly, to bias control of an array of low power modulator drivers provided on a single substrate.

2. Description of the Related Art

Modulator drive circuits have become commonplace in telecommunication systems as the need for increased network carrying capacity continues to grow. Generally, such a modulator drive circuit accepts a data signal as an input, e.g. a data signal to be transmitted over a network infrastructure, and generates an output modulator drive signal to be provided to a modulator, e.g. a Mach Zehnder modulator (MZM) or a semiconductor electro-absorption modulator (EAM). In response to the output modulator drive signal the modulator then modulates an optical carrier to facilitate optical transmission of the data signal across the network infrastructure. The modulator drive circuit output signal provided to the modulator generally comprises two signal components, a first signal component which represents the data signal and a second signal component which is used to bias the modulator to ensure that the modulator is operating to efficiently modulate the optical carrier. As such the first signal component is typically an alternating voltage signal or AC component of the output modulator drive signal, and the second signal is typically a steady-state voltage signal or DC component of the output modulator drive signal.

With reference to FIG. 1, a first known modulator drive circuit 100, which utilizes a bias circuit in the signal path, is shown. More specifically, drive circuit 100 comprises a modulator driver 104, and a bias circuit 106 located external to the modulator driver 104 and in the signal path of a modulator driver output signal 107. The modulator driver 104 is configured to accept an input data signal 102 labeled "$V_{in}$" in FIG. 1, typically a differential signal as depicted, at an input of the modulator driver 104 and generate the output signal 107 in response to the received input data signal 102, the output signal 107 provided to the bias circuit 106. As should be apparent to one of ordinary skill in the art, the primary purpose of the modulator driver 104 of FIG. 1 is to transform the differential input signal 102 into a single-ended signal having a common voltage reference with respect to a modulator 110. The modulator driver 104 is powered via a fixed voltage differential power supply which provides an upper fixed voltage of $V^+$ and a lower fixed voltage of $V^-$ to modulator driver 104, as shown. The fixed voltage supply provides a suitable voltage range, $V^+$-$V^-$, to accommodate the amplitude of the differential input data signal 102 such that the amplitude remains within the voltage range without clipping.

The bias circuit 106, often referred to as a bias tee circuit, comprises a capacitor 106C, an inductor 106L, and an adjustable DC bias voltage input, labeled DC BIAS in FIG. 1. The output signal 107 of the modulator driver 104 is AC coupled through the capacitor 106C such that the AC component of the modulator driver output signal 107 is on to the modulator 110 as the AC component of an input signal 108. In addition to passing the AC component of the output signal 107, capacitor 106C correspondingly prevents any DC voltage which may exist as part of output signal 107. The DC BIAS voltage is coupled through the inductor 106L and passed on to the modulator 110, the capacitor 106C also preventing the DC bias voltage from entering the modulator driver 104. The DC bias voltage is provided as the DC component of the input signal 108, as is known in the art.

Such a circuit 100, however, has several drawbacks. First, the component count of modulator drive circuit 100 is high, especially when a plurality of such circuits 100 are formed as part of an integrated circuit on a single substrate. The component count can further increase since the inductor 106L, as part of the bias circuit 106 formed on a single substrate, is typically fabricated from a plurality of inductors arranged in series or parallel to achieve a desired broadband response, for example a first inductor having a small inductance and a high frequency response arranged in series with a second inductor having a large inductance and a small frequency response. Second, the size of the modulator drive circuit 100 is physically large when compared to other solutions which do not incorporate bias circuits, such as the bias tee circuit 106 provided in the signal path of the modulator driver 104 output signal 107. The components of the bias circuit 106, capacitor 106C and inductor 106L, occupy a large physical size on a semiconductor chip. Additionally, this problem is exacerbated by the fact that the modulator drive circuit 100 may be one of a plurality of modulator drive circuits, where it is desired to provide the plurality of modulator drive circuits on a single substrate as part of a semiconductor integrated circuit chip. Moreover, it is desirable to reduce the distance of the signal path between the modulator driver 104 and the modulator 110 to correspondingly reduce, or otherwise minimize, the associated transmission line effects.

With reference to FIG. 2, another alternative known general approach to providing the DC BIAS voltage signal component, or DC component, of a modulator driver output signal to a modulator is depicted. Modulator drive circuit 200, while it does not include an external bias tee in the signal path of the modulator driver output signal, utilizes a large modulator driver power supply to generate the DC BIAS voltage. Similar to the modulator circuit 100 of FIG. 1, modulator circuit 200 comprises a modulator driver 204 which accepts a data signal 202 at an input to the modulator driver 204. Unlike modulator driver circuit 104, however, modulator driver circuit 204 accepts a DC bias voltage control signal, labeled as "DC BIAS Control" in FIG. 2. The DC bias voltage is derived by circuitry, as part of the modulator driver 204, from the DC bias voltage control signal. Therefore, rather than the DC bias voltage signal provided in the signal path of the modulator signal output, the DC BIAS voltage is derived from a DC bias voltage control signal provided to the driver circuit 204. Based upon the derived DC BIAS voltage, the driver circuit 204 then provides the DC component of a modulator driver output signal 208, provided at an output of modulator driver 204. Typically, the DC bias voltage is added to the AC component of the modulator driver output 208 derived from the input data signal 202 through the use of summing circuits, comprising operational amplifiers for example, as is known in the art.

The modulator driver 204 is powered via a fixed voltage differential power supply which provides an upper fixed voltage of $V^+$ and a lower fixed voltage of $V^-$ to modulator driver 204, as shown. Therefore, in addition to the DC bias voltage input provided to the modulator driver 204, the fixed voltage supply is provided to power the circuitry of the modulator driver 204 itself. While the approach of modulator drive circuit 200 allows for positioning the modulator driver 204 closer to a modulator 210, the modulator driver circuit 200 requires the fixed voltage power supply to supply a high voltage to the modulator driver 204. More specifically, the modulator driver 204 fixed voltage power supply must be able to provide a sufficient power and voltage range to accommodate the peak-to-peak voltage range of the AC component of the modulator driver 204 output signal 208, in addition to the voltage range of the DC component of the modulator driver 204 output signal 208. This leads to high power dissipation in the modulator driver 204, which can lead to thermal related problems especially where the modulator driver circuit is positioned in close proximity to modulated optical sources.

Furthermore, where it is desirable to provide for control electronics on the same substrate as the modulator drive circuit 200, e.g. on the same semiconductor chip, the modulator drive circuit 200 configuration restricts the integrated chip technologies which can be used for fabrication. For example, silicon-based integrated circuit technologies have low breakdown voltage requirements and, therefore, cannot easily accommodate the large modulator driver supply voltage.

What is needed is a high-speed, low power modulator drive circuit which generates a proper modulator drive signal, having both AC and DC components, through the use of an output bias voltage control without the need for a bias tee formed in the signal path of the modulator drive output signal. Further, what is needed is a high-speed, low power modulator drive circuit which does not require application of a DC bias voltage as a separate input directly to the modulator driver circuit. Additionally, what is needed is a controller for controlling the power applied to the modulator driver, as part of the modulator drive circuit, to provide control over the DC component of the modulator drive signal, as well as other operating characteristics of the modulator drive circuit. Last, what is needed is the ability to provide an array of such modulator driver circuits, along with the associated control circuitry, on the same substrate.

SUMMARY OF THE INVENTION

According to this disclosure, embodiments of the present invention include a modulator drive circuit for providing a modulator drive signal having both AC and DC components which is used to driver a modulator. The modulator drive circuit comprises a modulator driver powered by a variable or adjustable voltage, provided from a corresponding power source, which eliminates the need for a separate DC bias signal to be provided to the modulator drive circuit, or in the signal path of the modulator driver output signal. The variable or adjustable voltage acts to bias the modulator drive circuitry itself, as opposed to providing an additional DC bias signal, within an operating voltage range. In certain embodiments, the power source for the variable voltage, or portions thereof, may be located adjacent the modulator driver, for example on the same substrate as the modulator drive circuitry.

In certain embodiments of the present invention, the modulator drive circuit includes a controller for controlling an amplitude of the AC component of the modulator driver output signal. In further embodiments, the controller may include a variable or adjustable current source to generate a corresponding voltage from which the amplitude of the AC component of the modulator driver output signal is derived. Preferably, the modulator drive circuit elements, including the controller, are provided on the same substrate in a photonic integrated circuit. In certain other embodiments of the present invention, the controller accepts command signals through a digital serial interface or Serial Peripheral Interface.

In still certain other embodiments of the present invention, a plurality of modulator drive circuits, along with associated control electronics, are fabricated on a single substrate in a photonic integrated circuit. In certain other embodiments of the present invention, each modulator drive circuit is fabricated on a single substrate using a silicon geranium BiCMOS process such that high-speed transistor technology can be utilized for a first portion of the modulator drive circuit, while lower-speed transistor technology can be utilized for a second portion of the modulator drive circuit.

BRIEF DESCRIPTION OF THE DRAWINGS

In the drawings wherein like reference symbols refer to like parts:

FIG. 1 is a general circuit diagram of a modulator drive circuit of the prior art.

FIG. 2 is a general circuit diagram of another modulator drive circuit of the prior art.

DETAILED DESCRIPTION OF THE INVENTION

Figure 3:
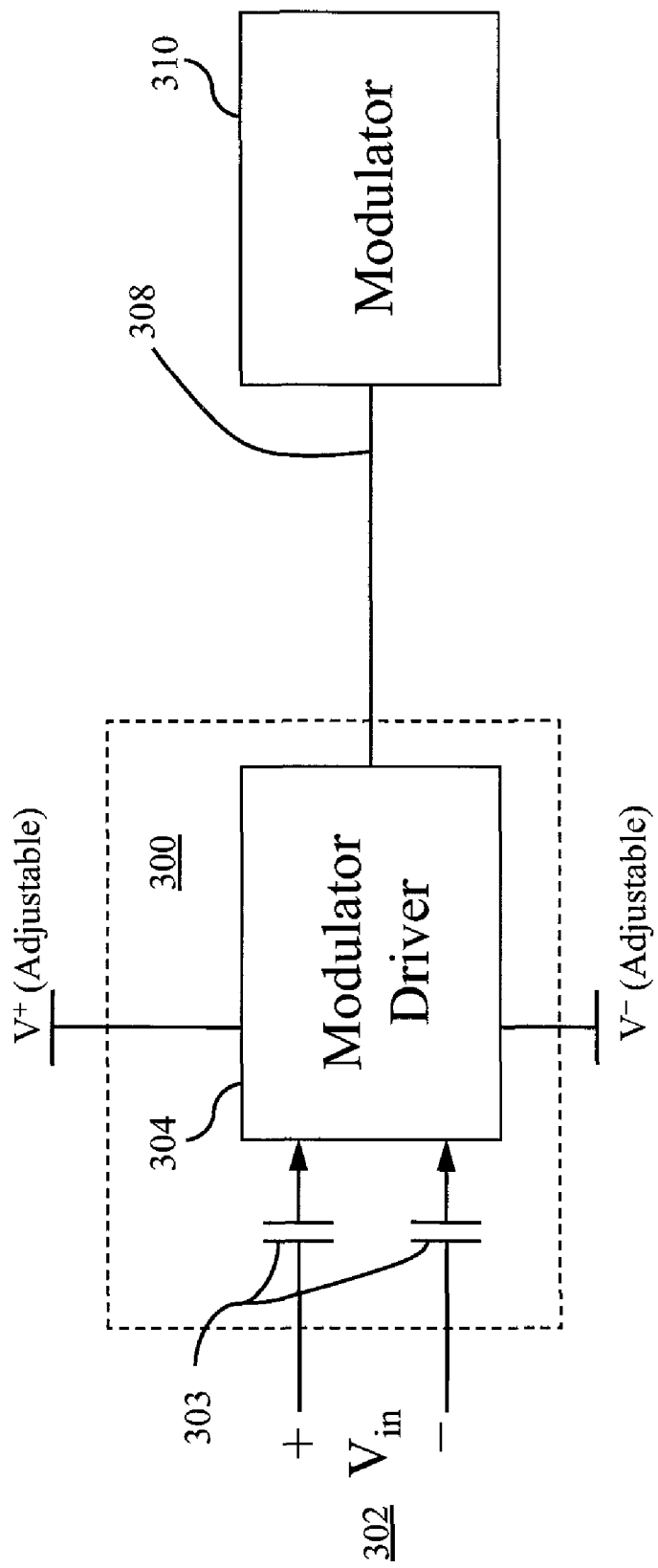
FIG. 3 is a general circuit diagram of the modulator drive circuit of this invention.

Reference is now made to FIG. 3, showing a general diagram of a modulator drive circuit 300 according to this invention. Modulator drive circuit 300 comprises a modulator driver 304 which accepts an AC coupled input signal 302, labeled "Vin" in FIG. 3, and provides an output signal 308 suitable to drive a modulator 310, an EAM or MZM for example. Driver 304 provides both the AC and DC component of the modulator drive signal, as part of output signal 308, as well as the amplitude of the AC component. As with modulator drivers 104 and 204 discussed above, modulator driver 304 transforms the input signal 302, AC coupled through capacitors 303, into the AC component of the modulator driver output signal 308. Additionally, as with drivers 104 and 204, the driver 304 is supplied with power via power supply inputs labeled V+ (Adjustable) and V− (Adjustable). However, in the case of modulator 304, no external DC bias signal or DC bias control signal is provided, neither in the signal path itself as in the case of the bias tee of FIG. 1, nor provided to the modulator driver 304 as a separate input. Rather, the DC BIAS signal is provided through the application of the variable or adjustable power supply voltages provided, as will become more readily understood in the discussion below.

Modulator driver 304, as with drivers 104 and 204, is typically formed from a plurality of active components, such as bipolar junction transistor elements, as well as passive elements, such as resistor and capacitor networks. As should be apparent to one of ordinary skill in the art, such circuitry is not directly dependent on the power supply voltage values provided to the circuitry to properly function, but rather the overall voltage range. For example, while the power supply voltage range applied to the modulator driver 304 can be maintained at 5V DC (V+(Adjustable)−V−(Adjustable)=5V DC), voltage V+(Adjustable) itself can range, for example, from about −6 V DC to about +6 V DC, if desired, in order to achieve and maintain a proper DC BIAS voltage. Therefore, as should now be apparent to one of ordinary skill in the art, rather than providing a separate DC BIAS signal, either in the signal path or indirectly to the modulator driver through application of a DC bias control signal, the DC BIAS is derived internal to the modulator driver 304 by simply moving the power supply voltage values provided to the modulator driver 304 within a sufficiently wide voltage range. That is, the entire modulator driver 304 is effectively biased through application of adjustable power supply voltages, rather than simply the output signal. As mentioned above, the modulator driver 304 of FIG. 3 utilizes the power supply path or power supply rails, V+ (Adjustable) and V− (Adjustable), to provide for the DC BIAS component of the output modulator signal 308.

Since the modulator driver supply rails are adjustable, for example V+ Adjustable and V− Adjustable voltage values, the input signal 302, representing a data signal to be modulated, must be AC coupled, for example, via capacitors 303 as depicted in FIG. 3, to the modulator driver 304 circuitry. Also, since the supply rails of the modulator driver 304 are adjustable, great care must be taken when providing a plurality of such modulator drivers 304 on a single substrate. Since each of the plurality of drivers 304 must have its own supply rails, each individual modulator driver of the array of drivers must be isolated with respect to each other. In other words, the single substrate must support the condition in which each modulator driver 304, as part of a modulator array, is at a potentially different bias voltage. Care must be taken to avoid junction breakdown of the substrate and the active components of other modulator drivers which are biased at higher voltages.

The modulator driver circuit 300 configuration of FIG. 3 provides for specific benefits. For example, it is physically easier to provide the DC BIAS via the power supply paths rather than providing the DC BIAS via the modulator output signal 308 signal path. The modulator driver 304 can be positioned in close proximity to the modulator 310 itself, especially with the lack of a bias tee circuit in the signal path of the output modulator signal 308. For illustration purposes only, with no bias tee in the signal path, the modulator driver 304 can be positioned within approximately 100 μm of the modulator. If a bias tee were used on the modulator driver 304 output, for example in line with the output signal 308 as generally depicted in FIG. 1, physical considerations would prohibit such a close placement.

As stated above, the modulator driver circuit of FIG. 3 also provides for a relatively low power system since the modulator driver power supply voltage of each modulator driver 304 does not need to support both the AC peak-to-peak voltage swing and the range of DC bias voltages. Only the AC peak-to-peak voltage need be supported by the adjustable power supply voltages of the modulator driver 304. As will be discussed in greater detail below, this configuration allows for two separate power return paths, a first suitable for high speed signals such as the output of the modulator driver 304, and a second suitable for low speed signals such as the variable power supply voltages feeding the modulator driver 304.

Figure 4:
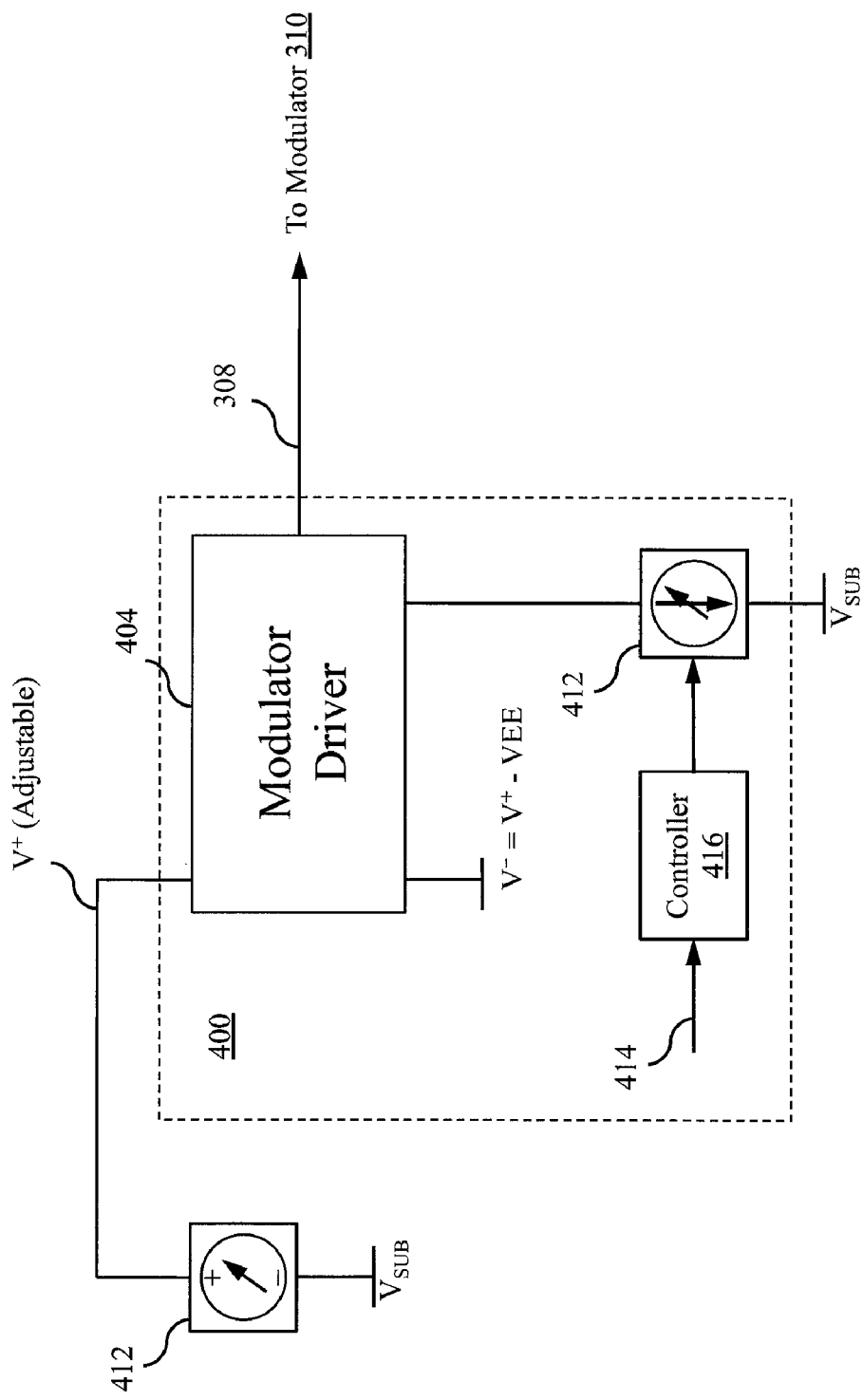
FIG. 4 is a more specific circuit diagram of a portion of the modulator drive circuit of FIG. 3.

Now turning to FIG. 4, a more detailed diagram of an exemplary modulator driver circuit in accordance with the present invention will be discussed. More specifically, FIG. 4 depicts a modulator driver circuit 400 comprising a modulator driver 404, similar to driver 304, a variable current source 412 and a corresponding controller 416 for controlling the current source 412. For purposes of clarity the input signal $V_{in}$ is not depicted in FIG. 4, however the configuration of the input signal $V_{in}$ is similar to that depicted in FIG. 3, and as discussed above. The variable current source 412 is adjustable via a control signal 414 provided to the controller 416, which, in response to the received signal, controls the current source 412. The current source 412 is utilized to derive a desired amplitude for the AC component of the modulator output signal 308, as is discussed in greater detail below.

While not necessary, it is preferable to provide the current source 412, as well as other control electronics as described in more detail below, on the same substrate as the remaining elements of the modulator driver circuit 400. The control signal 414 may be provided to the controller 416 through any suitable means, such as for example, through the use of discrete networks having specific outputs in response to various voltage or current inputs, or, more preferably, digital communication interfaces. Digital communication interfaces allow for more flexible design with respect to future developments leading to newer modulator driver circuits which require a higher level of control. One such interface known in the art is the Serial Peripheral Interface or SPI. The digital interface provides a more efficient communication path with external digital circuitry through a four-wire or three-wire digital serial interface such as SPI. In this way, a reduction in external control circuitry components, as well as corresponding printed circuit board area, is provided. Moreover, this approach also reduces the optical modulator driver array control pin count from 30 analog pins to 5 digital pins.

As mentioned above, the modulator drive circuit 400 is preferably provided on a single substrate. As should be apparent, the modulator drive circuit 400 comprises both high speed functionality and low speed functionality. To provide for efficient die sizes and low power dissipation, the control electronics 416 may utilize different device technologies, one more directed to high speed circuits and one more directed to low speed circuits. However, use of such two different technologies can result in voltage level incompatibilities. For example, the control electronic circuits consisting of the SPI, operational circuits, and DAC circuits, may use complementary metal oxide semiconductor (CMOS) devices, and the high speed circuits of the modulator driver 404 may use bipolar junction transistor (BJT) devices. Special design techniques are required to ensure that the CMOS and BJT devices both can coexist and properly communicate while provided on the same semiconductor substrate. The problem is exacerbated by the higher voltages typically required by the high speed modulator driver 404 circuitry when compared to the low breakdown voltage characteristics of the CMOS devices. Utilizing the low voltage modulator driver power supplies, and adjusting the optical modulator driver output bias voltage by adjusting the modulator driver power supplies further increases the large voltages applied to the CMOS control devices. In cases where an array of modulator drive circuits 404 and associated voltage supply circuitry are provided on a single substrate, electrical isolation of each modulator driver 404 must be maintained, as described in greater detail below.

Since the modulator drive circuit 400 comprises both high speed and low speed functions, the semiconductor process used to fabricate the modulator drive circuit 400 is preferably a silicon germanium (SiGe) BiCMOS process allowing for fabrication of both SiGe NPN transistors and CMOS transistors. In this process, the NPN transistors are generally used for the high speed circuits in the optical modulator driver 404, and the CMOS transistors are generally used for the controller 416 and the current source 412 which the controller 416 controls, as well as the SPI and additional control electronics, as discussed in greater detail below.

As stated above, the modulator drive circuit 400 is preferably provided on a single substrate, the substrate having a voltage potential of $V_{SUB}$, as shown. A variable power source 418, preferably located external to modulator drive circuit 400 as depicted, provides the adjustable voltages $V^+$ and $V^-$ to the modulator drive circuit 400. Through operation of the voltage source 418, the input voltage $V^+$ applied to modulator driver 404 is correspondingly adjusted.

The adjustable voltage $V-$ can be adjusted in similar fashion to voltage $V+$, or alternatively can be held at a fixed voltage with respect to voltage $V+$. As depicted in FIG. 4, the voltage $V-$ is held to be a voltage VEE less than the voltage $V+$. In this way, as the power supply voltage $V+$ is adjusted, the voltage $V-$ is correspondingly adjusted to maintain the constant voltage differential VEE. Typically VEE is 5 VDC, but any suitable range which provides the proper functionality of the modulator driver 404, as described herein or known in the art, can be utilized. In this way, the voltage $V+$, as well as the corresponding voltage $V-$, can be adjusted to bias the modulator driver 404 circuitry to derive the proper DC component of the modulator driver output signal to be provided to the modulator. This DC component is simply adjusted through the proper commands provided to the current source 412 to develop the corresponding desired voltage values $V+$ and $V-$. As stated above, such a modulator driver circuit 400 is advantageous since it does not require additional circuitry, such as a bias tee, in the signal path of the modulator driver output signal to the modulator which allows the modulator driver to be placed in close proximity to the modulator itself, limiting the transmission line effects of the signal path of the modulator driver output signal. Furthermore, by biasing the modulator driver through the adjustment of the modulator driver supply voltages, there is no need for additional high power supplies which would provide a separate DC BIAS signal to the modulator driver, the high power supplies needing to be able to support the ranges of both the desired DC BIAS voltage range, as well as the AC component voltage range corresponding to the input voltage Vin.

Figure 5:
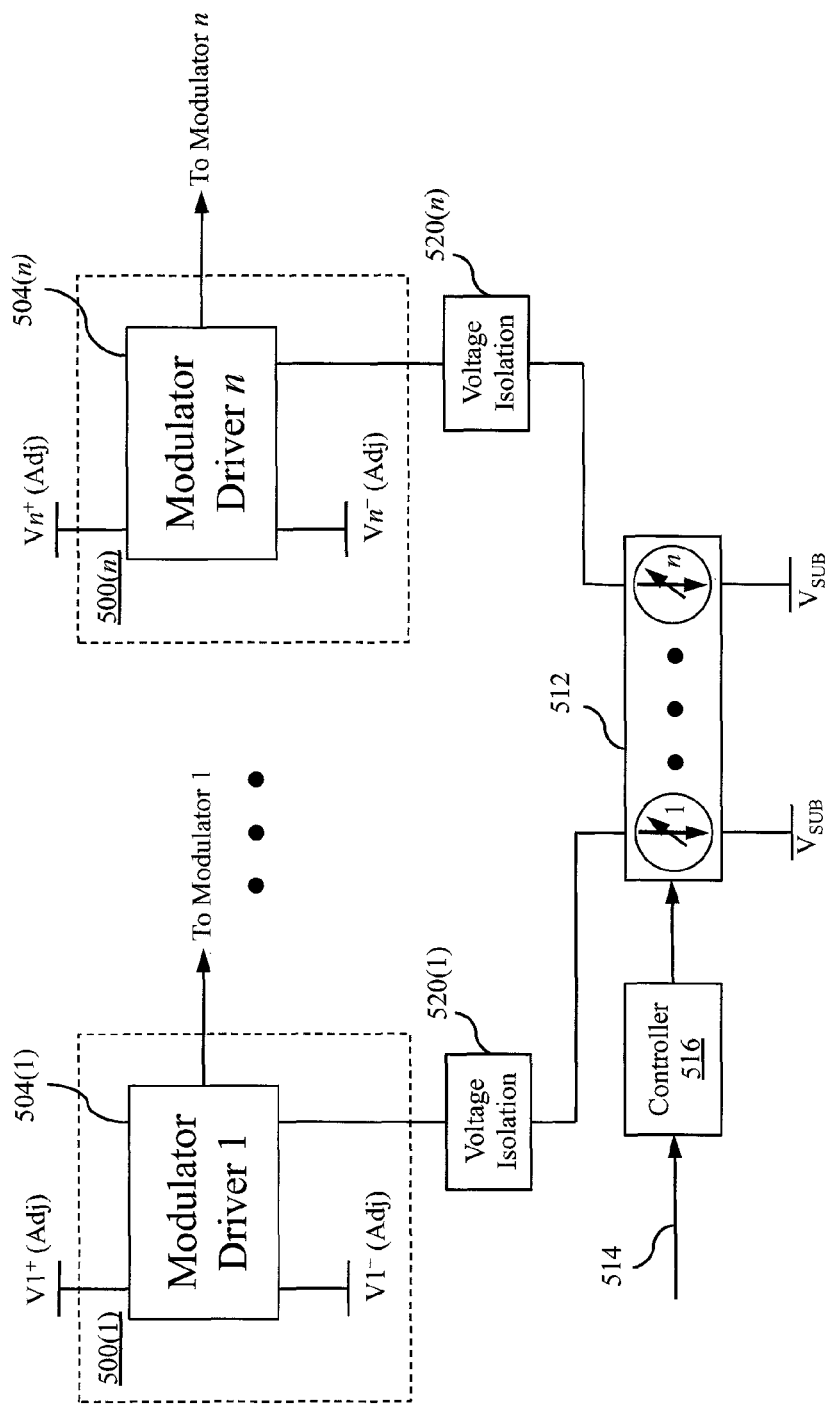
FIG. 5 is a more specific circuit diagram of a portion of the modulator drive circuit of FIG. 3 formed in an array of modulator drive circuits on a single substrate, in accordance with various embodiments of the present invention.

Now turning to FIG. 5, a more specific circuit diagram of a portion of the modulator drive circuit of FIG. 4 formed in an array of modulator drive circuits on a single substrate will be discussed in greater detail. FIG. 5 depicts a modulator circuit 450 which comprises an array of n modulator driver 504(n) circuits similar to modulator drive circuit 400 of FIG. 4. Each of the modulator drivers 504, for example 1 through n, is provided with a corresponding variable or adjustable voltage, V1$^+$ through Vn$^+$ for example, to drive and bias the corresponding modulator driver circuitry, in a manner similar to the modulator drive circuit 400. Modulator circuit 450 further comprises an array of current sources 512(n), an array of voltage isolation circuits 520(n), and a controller 516. The controller 516 is provided to control each of the individual current sources 512(n), from which an amplitude of the AC component of the corresponding modulator driver output signal is provided. Each individual current source 512(n) is preferably individually controlled to provide for specific control of the associated amplitude of the AC component of the output modulator signal of each corresponding modulator driver 504(n).

As with the modulator driver 404, each of the modulator drivers 504(n) is preferably integrated on the same substrate as the individual current sources 512(n), as well as controller 516. Therefore, the technology utilized to fabricate the optical modulator driver circuit 450 is preferably a mixed signal technology which offers fabrication of both high speed devices and high integration/low power devices. Preferably, the control circuit semiconductor process used to fabricate each of the array of modulator drive circuits 500(n), as well as the voltage isolation circuitry 520(n) and control electronics 516, is preferably a SiGe BiCMOS process allowing for both SiGe NPN transistors and CMOS transistors. In this process, the SiGe NPN transistors are generally used for the high speed circuits in the optical modulator driver 504, 1 through n, and the CMOS transistors are generally used for the digital serial interface, such as a SPI, and additional control electronics, if desired. For illustration purposes only, such additional control electronics elements may include, but are not limited to, operational amplifiers, digital to analog converters (DACs), and other low speed analog circuits which make up current source 512.

Various aspects of the modulator driver 504 may also be controlled through operation of the control electronics 516. Such control electronics 516 may include additional DACs, operational amplifiers, or other transistor-based circuitry, which are necessary to control modulator driver 504(n) operating parameters. Such operating parameters of the modulator driver 504(n) may include, but are not limited to, the electrical crosspoint of the modulator driver and the output voltage amplitude, which is derived from current source 512, for example. As described above, relative to the current source 512 as part of the modulator drive circuit 450, each of the modulator drivers 504(n) can be controlled via a digital serial interface, such as a three-wire or four-wire digital serial interface, an SPI for example, which interfaces to digital circuitry external to the modulator drive circuit 450. The external digital circuitry sends digital commands via one or more digital signals 514 to the control electronics 516 integrated onto the modulator drive integrated circuit 450. Providing such modulator driver control as part of the modulator drive circuit 450 results in further reduced pin count since direct connections between the control electronics and the various circuit elements of the modulator drive circuit can be replaced through the digital serial interface.

Another problem which arises when providing an array of modulator drivers 504, as well as associated control electronics, on a single substrate, a p-type substrate for example, is electrical isolation between each corresponding modulator driver 504(n) with respect to the remaining modulator drivers 504(n), as well as electrical isolation between each corresponding modulator driver 504(n) and the control electronics 516, the modulator drivers 504(n) being fabricated from a SiGe process, while the control electronics 516 are fabricated from a CMOS process.

Since each of the modulator drivers 504(n) receives a separate adjustable power supply voltage $V^+$ to drive a corresponding one the array of modulator drivers 504(n), as described above, the individual modulator drivers 504(1) through 504(n) must be electrically isolated from the remaining modulator drivers 504. Therefore, when the DC BIAS value, as derived from the corresponding supply voltage $V^+$ of one of the plurality of modulator drivers 504(n), is adjusted, such adjustment must remain isolated from the remaining modulator drivers 504(n). In order to achieve proper isolation of each adjustable voltage $V^+$ individually supplied to each of the modulator drivers 504(n), the substrate potential must be equal to or lower than the lower supply voltage potential $V^-$, and the voltage potential difference between the upper voltage $V^+$ and the substrate must not exceed the substrate breakdown potential voltage. With the N-well of each of the bipolar transistors, as part of each modulator driver circuit 504(n), on the common P substrate, and, thus, reverse biased with respect to the common substrate, all the bipolar transistors, as part of each modulator driver circuit 504(n), are thereby isolated from bipolar transistors of the other modulator driver circuits. Further, RF isolation between the various modulator driver circuit 594(n) output signals can also be improved through the application of guard rings (not shown), where each modulator driver circuit 504(n) is surrounded by a ring of P-implant material biased to the associated negative power supply rail, V⁻, further surrounded by a ring of N-implant material biased to the positive power supply rail, V⁺.

Figure 6:
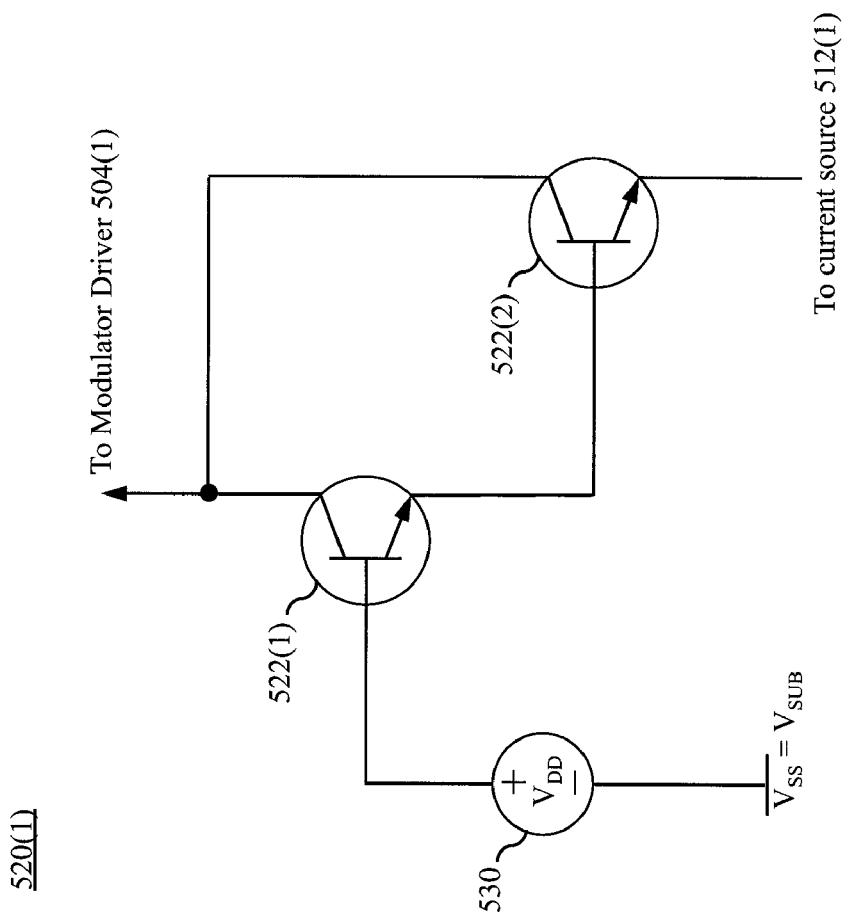
FIG. 6 is an exemplary voltage isolation circuit in accordance with various embodiments of the present invention.

Additionally, in order to properly electrically isolate each modulator driver 504(n) and associated supply voltage from the CMOS based control electronics, a voltage isolation circuit 520 is provided as depicted in FIG. 5. Voltage isolation circuit 520(n) can be any suitable circuit which provides the proper functionality while limiting the voltage differential between the NPN transistor circuitry associated with the modulator circuit 504(n) and the CMOS circuitry associated with the current sources 512(n). Now turning to FIG. 6, one exemplary voltage isolation circuit 520(1) is depicted. The exemplary voltage isolation circuit 520(1) depicted in FIG. 6 is for illustration purposes only and not to be limiting. The isolation circuit 520(1) of FIG. 6 comprises two BJT transistors 522(1), 522(2) arranged in a Darlington pair configuration. As shown, the base of transistor 522(1), the effective base of the Darlington pair, is coupled to a voltage source having a potential of VDD, which also powers the remaining CMOS circuit elements, as part of the modulator driver circuit 500, for example. The emitter of transistor 522(2), the effective emitter of the Darlington pair, is coupled to the current source 512(1) while the collectors of transistors 522 are coupled to the power supply input voltage for modulator driver 504(1), at node A1 of the modulator driver circuit 500 of FIG. 5, for example. The Darlington pair provides the necessary current amplification allowing the controlled current sources 512 to function, while providing adequate voltage isolation between the NPN transistor circuit elements of the modulator driver 504 and the CMOS circuit elements of the current sources 512 and control electronics 516 to prevent junction breakdown.

Figure 7B:
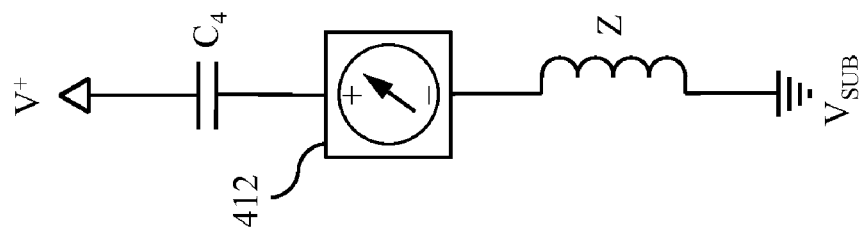
FIG. 7B is a general circuit diagram depicting a variable voltage source utilized to power the modulator driver circuit, in accordance with various embodiments of the present invention.
Figure 7A:
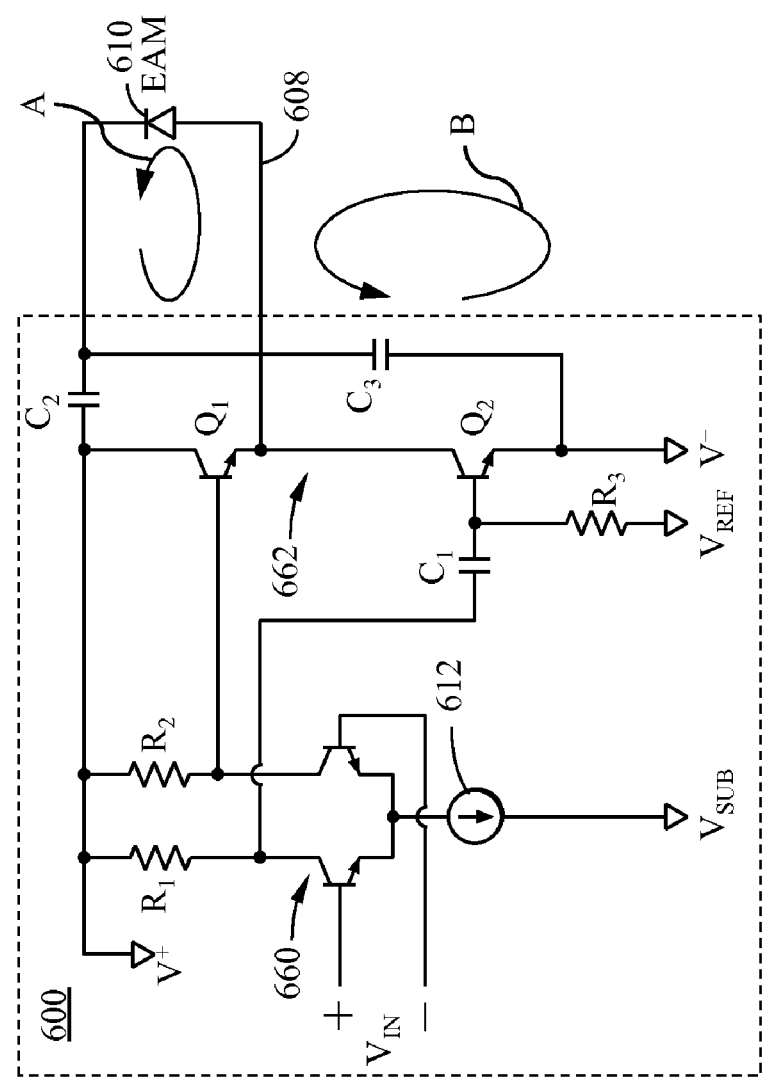
FIG. 7A is an exemplary modulator driver circuit which may be used in accordance with various embodiments of the present invention.

Turning to FIG. 7A, an exemplary modulator drive circuit 600 will be discussed in greater detail. It is important to note that the exemplary modulator drive circuit 600 is one of many different drive circuits which may be used in accordance with the present invention and, therefore, the exemplary modulator drive circuit 600 is not meant to be limiting. More detail regarding various aspects of the modulator circuit 600 can be found in U.S. Pat. No. 6,707,589, which is incorporated herein in its entirety by reference. Generally, the modulator drive circuit 600 comprises an emitter coupled differential circuit 660, an output section 662, and a current source 612. The output section 662 develops a modulator output signal 608 which is then provided to drive a modulator 610. While depicted as an electro-absorption modulator (EAM), other modulators which rely on a voltage to modulate an optical signal known in the art may be used. The output signal 608 produced by the output section 662 and applied to the modulator 610 comprises a series of pulses corresponding to the rising and falling edges of the input signal $V_{IN}$ and conditioned to properly drive the modulator 610. This output voltage signal, as part of the output signal of the drive circuit 600, drives the modulator 610 and provides the desired modulated optical signal corresponding to the input $V_{IN}$ received. A reference voltage VREF is provided to bias the output section 662 of the modulator drive circuit 600, providing that Q2 has a nominal quiescent bias current.

The current source 612 is similar to the current source 512 of drive circuit 500 of FIG. 5. If desired, additional circuitry, as part of the drive circuit 600, may be provided to control the output of the current source 612. Such additional circuit elements may be part of the current source circuitry or may be part of a controller 616, utilized to control the current source in a manner similar to controller 516 controlling current source 512(1) for example. As discussed above, the primary purpose of the current source 612 is to provide a desired amplitude associated with the AC component of the output signal 608.

As discussed above relative to other embodiments, an adjustable or variable voltage V⁺ is provided to the modulator circuit 600. Adjustment of the variable voltage V⁺ results in biasing the modulator drive circuit 600 in its entirety, such biasing resulting in application of a desired DC BIAS to the modulator drive circuit 600 output signal 608 forming the DC component of the output signal 608. The DC component of the output signal 608 ensures that the modulator 610 operates in a desired operating region such that the modulator provides the corresponding desired optical output sufficient to modulate an optical signal.

The close proximity of the modulator drive circuit 600 to the modulator 610 allows for very short electrical connections therebetween, eliminating transmission line effects and resulting in a short high-frequency return path, as indicated by arrows A and B, via capacitors C2 and C3, respectively. Now referring also to FIG. 7B, the variable voltage V+ provided by variable or adjustable source 412 is established external to modulator drive circuit 600 and provided to the circuit 600 as depicted in FIG. 7A. The voltage source 412 and the modulator drive circuit 600 share a common circuit ground, depicted as VSUB in FIGS. 7A and 7B. However, with the location of the variable source a much greater distance from the modulator 610 than the modulator drive circuit 600, the additional distance is seen by the modulator 610 as an impedance, depicted as impedance Z in FIG. 7B. Due to this impedance, even though the variable current source 412 and the modulator 610 share the same common ground VSUB, the return path for the high-frequency portion of the modulator output signal 608 remains short as depicted by arrows A and B in FIG. 7A. In contrast, the low-frequency portion of the modulator output signal 608, that is that portion derived from the variable voltage V+, follows a return path through impedance Z, finally returning to the variable source 412, as depicted in FIG. 7B.

While the invention has been described in conjunction with several specific embodiments, it is evident to those skilled in the art that many further alternatives, modifications and variations will be apparent in light of the foregoing description. For example, principals of operation of the modulator driver circuit of this invention may be applied to other types of optical modulators, other than EAMs or MAMs for example, or any other type of electro-optic modulator that relies on the electro-optic effect to change the refractive index of a certain material through the application of an applied electric field. Thus, the invention described herein is intended to embrace all such alternatives, modifications, applications and variations as may fall within the spirit and scope of the appended claims.

What is claimed is:

1. An integrated circuit comprising:
a substrate;
a modulator driver circuit provided on the substrate for generating a modulator drive signal having an AC component and a DC component, the modulator driver circuit having an input and an output, the input of the modulator driver circuit configured to accept a data signal, the data signal being AC coupled to the input of the modulator driver circuit, the modulator driver circuit providing the modulator drive signal at the output of the modulator driver circuit;

an adjustable current source circuit provided on the substrate, the adjustable current source electrically coupled to the modulator driver circuit, such that the adjustable current source circuit controls an amplitude of the AC component of the modulator drive signal; and a controller having an input and an output provided on the substrate, the controller electrically coupled to the adjustable current source circuit, the controller being configured to provide an output command signal on the output of the controller in response to an input command signal received on the input of the controller, the adjustable current source providing a corresponding one of the plurality of currents values in response to the output command signal received from the controller, wherein an adjustable power supply voltage is provided to the modulator driver circuit, such that the modulator driver circuit generates the DC component of the modulator drive signal based on the adjustable power supply voltage, the adjustable power supply voltage being configured to be a differential adjustable power supply voltage including a first variable supply voltage and a second variable supply voltage.

2. The integrated circuit of claim 1, wherein the AC component of the modulator drive signal is derived from the data signal.

3. The integrated circuit of claim 1, wherein data signal is a differential signal.

4. The integrated circuit of claim 1, further comprising a digital serial interface, the input command signal provided to the input of the controller through the digital serial interface.

5. The integrated circuit of claim 4, wherein the digital serial interface is a Serial Peripheral Interface.

6. The integrated circuit of claim 5, wherein the Serial Peripheral Interface is a three-wire interface or a four-wire interface.

7. The integrated circuit of claim 1, wherein the integrated circuit is fabricated by a silicon germanium BiCMOS process such that the modulator driver comprises a plurality of NPN transistors, and the current source comprises a plurality of CMOS transistors.

8. The integrated circuit of claim 1, wherein the modulator driver circuit is a first modulator driver circuit, the modulator drive signal generated by the first modulator driver circuit is a first modulator drive signal, the adjustable current source is a first adjustable current source, the adjustable voltage is a first adjustable voltage, and the data signal at the input of the first modulator driver is a first data signal, the integrated circuit further comprising:

a second modulator driver provided on the substrate for generating a second modulator drive signal having an AC component and a DC component, the second modulator driver having an input and an output, the input of the second modulator driver configured to accept a second data signal, the second data signal AC coupled to the input of the second modulator driver, the second modulator driver providing the second modulator drive signal on the output of the second modulator driver;

a second adjustable current source provided on the substrate, the second adjustable current source electrically coupled to the second modulator driver, such that the second adjustable current source controls an amplitude of the AC component of the second modulator drive signal; and a second adjustable voltage provided on the substrate to power the second modulator driver, the second adjustable voltage biasing the second modulator driver such that the DC component of the second modulator drive signal is derived from the second adjustable voltage.

9. The integrated circuit of claim 8, wherein the second data signal at the input of the second modulator driver substantially forms the AC component of the modulator drive signal.

10. The integrated circuit of claim 8, wherein second data signal is a differential signal.

11. The integrated circuit of claim 8, further comprising a controller having an input, and a first output coupled to the first adjustable current source and a second output coupled to the second adjustable current source, the controller being configured to provide a first output command signal on the first output in response to a corresponding first input signal of a plurality of input signals and a second output command signal on the second output in response to a corresponding second input signal of the plurality of input signals received on the input, the first adjustable current source providing a corresponding one of the plurality of current values in response to the first output command signal received from the controller and the second adjustable current source providing a corresponding one of the plurality of current values in response to the second output command signal received from the controller.

12. The integrated circuit of claim 11, wherein the integrated circuit is fabricated by a silicon germanium BiCMOS process such that the modulator driver comprises a plurality of NPN transistors, and the controller comprises a plurality of CMOS transistors.

13. The integrated circuit of claim 11, further comprising a digital serial interface, the input command signal provided to the input of the controller through the digital serial interface.

14. The integrated circuit of claim 13, wherein the digital serial interface is a Serial Peripheral Interface.

15. The integrated circuit of claim 14, wherein the Serial Peripheral Interface is a three-wire interface or a four-wire interface.

16. The integrated circuit of claim 1, wherein the integrated circuit is configured to provide the modulator drive signal to a modulator.

17. The integrated circuit of claim 8, wherein the integrated circuit is configured to provide the second modulator drive signal to a second modulator.

18. The integrated circuit of claim 16, wherein the modulator is an electro-absorption modulator.

19. The integrated circuit of claim 16, wherein the modulator is a Mach-Zehnder modulator.

20. The integrated circuit of claim 16, wherein the second modulator is an electro-absorption modulator.

21. The integrated circuit of claim 16, wherein the second modulator is a Mach-Zehnder modulator.

* * * * *